Patented Dec. 29, 1936

2,066,002

UNITED STATES PATENT OFFICE 2,066,002

PROTECTIVE COMPOSITIONS

Ernest R. Hanson, Bloomfield, N. J., assignor to Halowax Corporation, New York, N. Y., a corporation of Delaware No Drawing. Application May 1, 1935,
Serial No. 19,176

20 Claims. (Cl. 134—17)

This invention relates to wax-like protective compositions particularly those characterized by resistance to both fire and water and suitable as insulation for wire cables, etc., or for the impregnation or coating of textiles, paper and other fibrous materials.

Flame retarding agents of recognized value are the halogenated cyclic hydrocarbons such as benzene, diphenyl, naphthalene, and their derivatives. It has been proposed that rubber be modified by the inclusion of such agents to thereby reduce inflammability of the rubber and obtain other useful properties, either by mechanical mixing with solid rubber or by the use of solvents. Due to the relatively large amounts which must be incorporated, however, to render the composition flame-retardant, mechanical mixing does not give the requisite intimate or uniform mixture, resulting in a structurally weak and porous coating or film. The loss of time involved in mechanical mixing is also objectionable and costly. More important, the heat developed by mechanical working produces a relatively high temperature which weakens rubber and undesirably affects its physical properties, such as life, stretch, etc. Furthermore, the heat of mechanical working causes many of the chlorinated hydrocarbons to vaporize so that they are not only lost from the composition but the vapors are objectionable. Mixing in the liquid state by the use of solvents is costly and oftentimes hazardous. Further, many of the solvents tend to remain in the composition with possible harmful effects as well as involving the steps of adding and later recovering them.

In one aspect, the present invention is directed to compositions involving condensed nuclear hydrocarbon compounds usually characterized by an angular annelid structure. It has been discovered that as a general rule the halogen derivatives of these hydrocarbons are gummy, waxy, amorphous bodies and as such are highly desirable in compositions containing a material such as rubber. Typical examples of these hydrocarbons are phenanthrene, retene, chrysene, etc. When chlorine is introduced into such compounds there results a very desirable gummy wax-like composition having low vaporization pressures which can be incorporated with rubber to produce a protective composition characterized by resistance to both fire and water and of a gummy waxy nature which makes it especially desirable for the coating of wire, cables, etc., or for the impregnation or coating of textiles, paper, or fibrous materials. The chlorine is preferably present to the extent of at least 31–40%. The other halogens may be used but are too expensive at present prices.

In order to add these compounds in sufficient amounts to rubber to attain a composition of the character desired I have discovered, however, that it is highly desirable to reduce them to the form of dispersions, that is, either as suspensions of fine solids or emulsions of liquids but preferably they are mixed with the rubber dispersions as emulsions. By the terms "dispersion" and "emulsion" I mean an intimate homogeneous mixture of discrete particles of small size in a non-solvent as distinguished from a solution where molecules are held in a solvent.

By later liberation of the non-solvent vehicle, it is thus possible to secure a substantially colloidal dispersion of one ingredient in the other, as the halogenated hydrocarbon dispersed in rubber. The association of the ingredients in the final mass is so intimate that the resulting composition is characterized by excellent fire and water resistance.

The dispersions in liquid media are excellent "dopes" for fabric airplane wings; the water or non-solvent shrinks and tightens the various fabric and upon evaporation leaves a water-proof and flame retardant coating that is light in weight, smooth, strong, yieldable, resistant to cracking. They can also be used as paints or paint bases particularly for undercoats as they spread well and are applicable to wood or metal; suitable colors can be included to form finish coats. They are furthermore useful as impregnating or coating compositions for fibrous sheets or boards or mixing with fillers, etc. and thereafter dehydrated to give moldable compositions.

Coatings produced in this manner are especially characterized by their uniformity, whereas in other methods such as the coating of wire by extrusion, it is extremely difficult to properly center the wire, such that a coating of uniform thickness is produced. As a consequence, it is necessary to coat the wire with a much thicker coating than is necessary in order to be certain that every portion is coated to the minimum thickness required for a satisfactory insulating material.

By the use of dispersions such as described in this invention, however, fire and water resistant coating compositions may be prepared which may be applied to fibre or other bases either by a dipping or a spraying operation to give a homogeneous coating of uniform thickness throughout. This results not only in a better coating of greater insulating value but also in a considerable saving of material since, due to the uniformity with which the coating may be applied, only the minimum thickness of coating is necessary. Moreover, there is less danger of the coating cracking when made with relatively large amounts of these angular annelid hydrocarbons than when made with the usual halogenated condensed ring materials, as the halogenated angular annelid hydrocarbons are gummy rather than crystalline in character. Thus in a fabric covered wire coated with a composition of rubber and halogenated angular annelid hydrocarbons, the wire can more readily be bent around corners without cracking the coating than when the usual halogenated condensed materials are used.

By the addition of a coagulant or precipitant, the compositions can be separated from the non-solvent in the form of a coagulated rubbery like mass which wax lubricated mass can thereafter be rolled, vulcanized, etc. mixed with various fillers, pigments, etc., or otherwise treated as is usual with rubber compositions. The mass is flexible, elastic and tough as well as fire and water resistant and is non-porous even in thin films. The colloidal dispersion of the halogenated hydrocarbon in the rubber permits vulcanization without material separation. Because of this fact, it is useful for the manufacture of hard rubber articles, and these articles may have a high rubber content and yet be flame-retardant.

As the rubber component, rubber brought into an emulsified form but preferably in the form of rubber latex is used. Hence rubber substitutes can also be utilized such as balata, gutta percha, or synthetic preparations, these being included under the term "rubber".

The halogenated cyclic hydrocarbons can range from syrupy liquids to solid wax-like materials. Preferably the halogenation should be restricted in percentage to give products melting below the boiling point of water so that emulsions in hot water can easily be formed from them. For chlorinated phenanthrenes this requirement indicates a chlorine content up to 35 to 50 per cent by weight. High melting point products can have low melting point products or solvents included in them so as to lower the melting point of the wax mass to within the desired range.

For forming the dispersions of the halogenated hydrocarbon various stabilizing agents can be included such as an ethanolamine (mono, di or tri) together with an acid as oleic or stearic acid, ammonium linoleate and other soaps, bentonite, gum arabic, cornstarch, Montan wax made basic, casein, etc. These agents are introduced into the water (or other liquid) and the molten or liquid halogenated hydrocarbon stirred in; the water is preferably hot enough to maintain the hydrocarbon in the liquid form while being mixed. Other ingredients such as fillers, pigments, vulcanizing agents, etc. can be added during the mixing operation of the halogenated angular annelid hydrocarbon dispersion with rubber latex or other rubber dispersion or can be added to or dispersed in the said hydrocarbon dispersion which may then be used directly to coat or impregnate wires. Vulcanizing agents, however, are preferably added just prior to use of the emulsions or dispersions to prevent their premature action on the rubber; this action may be delayed, however, by dissolving or dispersing in the hydrocarbon such vulcanizing agents as affect the rubber and may thereby be kept from contact with the rubber. Any agents which affect the hydrocarbons may be incorporated in the rubber and their action likewise delayed. When the dispersion is finally broken, the various agents can reach the rubber or hydrocarbon to react therewith.

Coagulation or precipitation of the dispersion can be accomplished by evaporation of the liquid or by means of a coagulant such as acetic acid. Other suitable coagulants are formaldehyde, acids generally, salts, oxides or sulfides, or metals like lead, antimony, magnesium, zinc or their mixtures, etc.

A specific example illustrative of the invention is here appended, but it is to be understood that the invention is not restricted thereto.

*Example.*—Normally solid chlorinated phenanthrene with about 40 per cent chlorine content and melting at about 100° C. is fused, and stearic acid is incorporated to about 10 per cent by weight of the phenanthrene product. The fused mass is then added with stirring to about twice its weight of hot water containing about 5 per cent of triethanolamine based on the weight of the hydrocarbon. An emulsion is thereby formed which remains stable when cooled and miscible with further amounts of water. The dispersion thus obtained is then incorporated with rubber latex or other rubber dispersion previously formed by stirring one into the other or in any other suitable manner. These can be mixed in any proportions, but about equal parts by weight gives a composition that is satisfactory for the uses contemplated. Both emulsions or dispersions remain stable during the mixing and they are capable of further dilution with water. They are coagulated by the addition of acetic acid or by evaporation of the water or other liquid in which they are suspended. When precipitated with acetic acid, it is found that the halogenated hydrocarbon is distributed as colloidal particles in the coagulated rubber, and no separation occurs at vulcanization temperatures. The product while having the characteristics commonly associated with rubber is likewise flame-retardant, thereby extending the utility of rubber to a very marked degree.

Retene is slightly soluble in water and more easily emulsified. Its melting point is substantially the same as phenanthrene and it can be treated in substantially the same way.

Chrysene is slightly soluble in water but its melting point is relatively high compared with phenanthrene and retene. The emulsifying agents, particularly those whose characteristics might be altered by the heat required to melt the chrysene are therefore preferably mixed with the water and the melted chrysene is emulsified into the water mixture.

Picene is insoluble in water and also has a relatively high melting point. It may be treated as chrysene.

The picene and chrysene may be mixed with phenanthrene or retene or other halogenated hydrocarbons, preferably containing sufficient halogen to render them fire resistant, to lower the melting points of the higher melting point materials and the proportions of ingredients as well as the ingredients themselves can be changed from those set forth in the preceding example. For instance the percentage of stabilizing agent included can be decreased or increased from that stated and there is no definite limit as to the amount of water except as determined by the degree of stability demanded and the contemplated applications to be made of the compositions. Likewise oxygenated products, ketones, ethers, esters and the like with the angular annelid hydrocarbon structure are suitable for the production of fire and water resistant compositions. The hydrocarbons may be dispersed directly into the rubber emulsion under certain conditions for instance where the rubber emulsion does not have to be heated to such a temperature that the rubber is injured. Thus normally solid chlorinated phenanthrene or retene may be melted and dispersed directly into rubber latex which may if desired be heated to 50 to 60° C. (or higher if the amount of emulsifying agent is sufficient to prevent the heat from breaking the emulsion and the rubber is not injured) to assist in the dispersion of the hydrocarbon; any of these hydrocarbons may also be mixed with solvents to lower their melting points for dispersion.

Besides the uses and applications heretofore given, the composite dispersions of halogenated angular hydrocarbons, rubber and the like made in accordance with the present invention, are capable of many others as will suggest themselves to those familiar with the art. The appended claims are therefore to be construed with a breadth commensurate with this disclosure, and as including equivalents.

I claim:—

1. Composition comprising a dispersion of a halogenated angular annelid hydrocarbon containing the phenanthrene group and rubber.

2. Composition comprising a dispersion of chlorinated angular annelid hydrocarbon containing the phenanthrene group and rubber.

3. Composition comprising a dispersion of a halogenated angular annelid hydrocarbon containing the phenanthrene group and rubber latex.

4. Composition comprising a dispersion of a chlorinated angular annelid hydrocarbon containing the phenanthrene group and rubber latex.

5. Composition comprising a coagulated dispersion of a halogenated angular annelid hydrocarbon containing the phenanthrene group and rubber.

6. Flame retardant composition comprising a coagulated dispersion of a halogenated angular annelid hydrocarbon containing the phenanthrene group and rubber.

7. Composition comprising a coagulated dispersion of a noninflammable halogenated angular annelid hydrocarbon containing the phenanthrene group and rubber.

8. Composition comprising a dispersion of a member of a group consisting of halogenated phenanthrene, halogenated retene, halogenated chrysene, halogenated picene, ethers, esters, ketones and oxygenated angular annelid products obtained therefrom, together with dispersed rubber whereby an intimate mixture of discrete particles is obtained.

9. Flame retardant composition comprising a dispersion of rubber and a halogenated angular annelid hydrocarbon containing the phenanthrene group, and having not less than 30 per cent of halogen.

10. Flame retardant composition comprising a dispersion of rubber and halogenated phenanthrene.

11. Flame retardant composition comprising a dispersion of rubber and halogenated phenanthrene, containing not less than 30 per cent of halogen.

12. Flame retardant composition comprising a disperson of rubber and chlorinated phenanthrene.

13. As an article of manufacture, a base having a coating comprising a dispersion of a halogenated angular annelid hydrocarbon containing the phenanthrene group and another material.

14. As an article of manufacture, a base having a coating comprising a dispersion of a halogenated angular annelid hydrocarbon containing the phenanthrene group and rubber.

15. Method of preparing compositions which comprises dispersing a halogenated angular annelid hydrocarbon containing the phenanthrene group with a non-solvent liquid in a dispersion of rubber.

16. Method of preparing compositions which comprises dispersing a halogenated angular annelid hydrocarbon containing the phenanthrene group with a non-solvent liquid in a dispersion of rubber and causing coagulation.

17. Method of preparing compositions which comprises forming a dispersion of a halogenated angular annelid hydrocarbon containing the phenanthrene group in a non-solvent liquid and mixing the dispersion with a dispersion of rubber.

18. Method of preparing compositions which comprises forming a dispersion of a halogenated angular annelid hydrocarbon containing the phenanthrene group in a non-solvent liquid and mixing the dispersion with a dispersion of rubber and causing coagulation of the dispersed mass.

19. Method of preparing coated bases which comprises preparing a dispersion comprising a halogenated angular annelid hydrocarbon containing the phenanthrene group and a liquid composition, and coating the base with said dispersion.

20. Method of preparing coated bases which comprises preparing a dispersion comprising a halogenated angular annelid hydrocarbon containing the phenanthrene group and a liquid composition, coating the base with said dispersion and causing coagulation.

ERNEST R. HANSON.